United States Patent
Yan et al.

(10) Patent No.: US 8,355,756 B2
(45) Date of Patent: Jan. 15, 2013

(54) SERVICE PROCESSING METHOD, COMMUNICATION SYSTEM AND RELEVANT DEVICES

(75) Inventors: Yongfu Yan, Shenzhen (CN); Ruinan Sun, Shenzhen (CN); Wenjie Zhu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/243,167

(22) Filed: Sep. 23, 2011

(65) Prior Publication Data

US 2012/0015631 A1    Jan. 19, 2012

Related U.S. Application Data

(63) Continuation of application No. PCT/CN2010/071247, filed on Mar. 24, 2010.

(30) Foreign Application Priority Data

Mar. 25, 2009 (CN) .......................... 2009 1 0130199

(51) Int. Cl.
*H04M 1/00* (2006.01)
(52) U.S. Cl. ............... 455/567; 455/411; 455/414.1; 455/420; 455/550.1; 379/418
(58) Field of Classification Search .................. 455/567, 455/410–414.4, 418–420
See application file for complete search history.

(56) References Cited

U.S. PATENT DOCUMENTS

| | | | | |
|---|---|---|---|---|
| 7,400,882 B2* | 7/2008 | Hahm et al. | ............... | 455/414.1 |
| 7,668,538 B2* | 2/2010 | Rosenberg et al. | ........ | 455/414.1 |
| 7,796,743 B2* | 9/2010 | Song et al. | ............... | 379/201.02 |
| 7,817,993 B2* | 10/2010 | Kim | .............................. | 455/418 |
| 7,889,715 B2* | 2/2011 | Criddle et al. | ................ | 370/352 |
| 7,889,856 B2* | 2/2011 | Wang et al. | .................... | 379/257 |
| 7,940,909 B2* | 5/2011 | Yan | .......................... | 379/201.05 |
| 8,027,444 B1* | 9/2011 | Martin et al. | ............ | 379/201.01 |
| 8,060,055 B2* | 11/2011 | Huang | .......................... | 455/401 |
| 8,098,811 B2* | 1/2012 | Singh | ........................ | 379/373.02 |
| 8,121,653 B2* | 2/2012 | Marti et al. | .................... | 455/567 |
| 8,170,194 B2* | 5/2012 | Shen et al. | ............... | 379/207.16 |
| 8,204,200 B2* | 6/2012 | Wang et al. | ............. | 379/207.16 |
| 8,233,943 B1* | 7/2012 | Othmer et al. | ................ | 455/567 |

(Continued)

FOREIGN PATENT DOCUMENTS

CN        1615663 A        5/2005

(Continued)

OTHER PUBLICATIONS

International Search Report issued in corresponding PCT Patent Application No. PCT/CN2010/071247, mailed Jul. 1, 2010.

(Continued)

*Primary Examiner* — Sharad Rampuria

(57) ABSTRACT

Embodiments of the present prevention disclose a service processing method, a communication system, and relevant devices to enable the user to more conveniently set ring tones and improve system security. The method includes: a management client located in a user terminal obtains a ring tone setting processing request of a user; and the management client sends the ring tone setting processing request to a service server through a mobile network so that the service server can perform corresponding processing according to the ring tone setting processing request. A communication system and the relevant devices are also disclosed in the embodiments of the present prevention. The embodiments of the present invention can enable the user to conveniently set the tone, reduce unnecessary network traffic, and improve system security.

10 Claims, 5 Drawing Sheets

U.S. PATENT DOCUMENTS

| | | | |
|---|---|---|---|
| 8,244,219 B2* | 8/2012 | Benninger | 455/567 |
| 8,255,006 B1* | 8/2012 | Chavez et al. | 455/567 |
| 2006/0250496 A1 | 11/2006 | Shin et al. | |
| 2007/0207782 A1* | 9/2007 | Tran | 455/414.1 |
| 2008/0063168 A1* | 3/2008 | Haley et al. | 379/201.01 |
| 2008/0198977 A1* | 8/2008 | Yan | 379/69 |
| 2008/0293390 A1* | 11/2008 | Yang et al. | 455/414.1 |
| 2009/0214003 A1* | 8/2009 | Yan | 379/87 |

FOREIGN PATENT DOCUMENTS

| | | | |
|---|---|---|---|
| CN | 1972470 A | 5/2007 | |
| CN | 1992754 A | 7/2007 | |
| CN | 1992755 A | 7/2007 | |

OTHER PUBLICATIONS

Open Mobile Alliance, "Customized Multimedia Ringing Architecture", Draft Version 1.0. OMA-AD-CMR-V1_0-2009-0306-D, Mar. 6, 2009.

1st office action issued in corresponding Chinese patent application 200910130199.9, dated Oct. 12, 2012, and English translation thereof, total 12 pages.

* cited by examiner

SERVICE PROCESSING METHOD, COMMUNICATION SYSTEM AND RELEVANT DEVICES

CROSS-REFERENCE TO RELATED APPLICATIONS

This application is a continuation of International Application No. PCT/CN2010/071247, filed on Mar. 24, 2010, which claims priority to Chinese Patent Application No. 200910130199.9, filed on Mar. 25, 2009, both of which are hereby incorporated by reference in their entireties.

FIELD OF THE INVENTION

The present invention relates to the communications field, and in particular, to a service processing method, a communication system and relevant devices.

BACKGROUND OF THE INVENTION

With the continuous development of the data service, different types of customized services have now emerged. For example, a Customized Ring Back Tone service is a service that allows a terminal user to customize ring back tones.

The customized ring back tone means the customized ring back tone, also known as the color ring back tone, which is heard by the calling user before the called user goes off-hook while the called terminal begins ringing after the calling terminal originates a call to the called terminal.

This customized ring back tone service opens the network capabilities of operators to the user, and provides service support for the user to demonstrate personality. It caters for the strong desire of modern people to demonstrate personality, and accomplishes good market effects.

Currently, in order to implement the customized ring back tone service in the prior art, the user gets connected to the Internet through a computer and accesses the site specified by operators to set the customized ring back tone service. The settings made by the user for the customized ring back tone service include: playing different ring tones in different time segments, and providing different ring tones for different users. The user can add a new ring tone, modify or delete an existing ring tone, and set the relevant personal groups.

However, because to set the customized ring back tone service, a user needs to get access to the Internet through a computer and accesses the site specified by operators. For the users lacking a computer nearby or unable to access the Internet, the solutions in the prior art frustrate the users to set the customized ring back tone service in real time.

With popularization of Wireless Application Protocol (WAP), a method for the user to access the site specified by operators on a user terminal directly through the WAP emerges.

However, it is required that the corresponding site generates corresponding pages accessible to the user terminal, which increases the complexity and maintenance workload of the site. Moreover, the user is still unable to set the customized ring back tone if the site is not accessible for certain reasons (such as suffering malicious attacks or routine maintenance).

Secondly, the WAP protocol still involves connection to the Internet to access the site specified by operators. The user information is vulnerable to theft due to insecurity of the Internet.

Finally, when the user terminal directly accesses the site through the WAP, the site transmits some information unrelated to the ring tone setting (such as recommended ring tones, and pictures on the page) to the terminal, which generates unnecessary network traffic.

SUMMARY OF THE INVENTION

Embodiments of the present invention provide a service processing method, a communication system, and relevant devices to enable the user to conveniently set ring tones and improve system security.

A service processing method provided in an embodiment of the present invention includes:

obtaining a ring tone setting processing request of a user, by a management client located in a user terminal; and sending, by the management client, the ring tone setting processing request to a service server through a mobile network so that the service server performs corresponding processing according to the ring tone setting processing request.

A communication system provided in an embodiment of the present invention includes:

a management client, configured to obtain a ring tone setting processing request of a user, and send the ring tone setting processing request to a service server through a mobile network; and a service server, configured to receive, through the mobile network, the ring tone setting processing request sent from the management client, and process a corresponding ring tone setting according to the ring tone setting processing request.

A management client provided in an embodiment of the present invention includes:

an operation request obtaining unit, configured to obtain a ring tone setting processing request from a user; and a request sending unit, configured to send, through a mobile network, the ring tone setting processing request obtained by the operation request obtaining unit to a service server so that the service server performs corresponding processing according to the ring tone setting processing request.

A service processing apparatus provided in an embodiment of the present invention includes:

a request receiving unit, configured to receive, through a mobile network, a ring tone setting processing request sent from a management client; and a processing unit, configured to process corresponding ring tone settings according to the ring tone setting processing request received by the request receiving unit.

The foregoing technical solutions reveal that the embodiments of the present invention have the following advantages:

In the embodiments of the present invention, the management client located in the user terminal sends the ring tone setting processing request to the service server directly through the mobile network after receiving the ring tone setting processing request from a user, with no need to access the website specified by the operators. Therefore, the direct interaction between the management client and the service server may enable the user to more conveniently set the ring tone anytime, without being affected by failure of the website.

Secondly, because the management client directly communicates with the service server with no need to access the site, the management client receives no information unrelated to the ring tone setting from the service server, thereby reducing unnecessary network traffic.

Finally, in the embodiments of the present invention, the management client interacts with the service server through a mobile network, without creating an Internet connection to the service server. The features of the mobile network ensure that security of the mobile network is higher than that of the Internet. Therefore, the ring tone setting performed through the mobile network in the embodiments of the present invention effectively improves system security.

DETAILED DESCRIPTION OF THE EMBODIMENTS

The embodiments of the present invention provide a service processing method, a communication system, and relevant devices to can enable a user to conveniently set a ring tone and improve system security.

Figure 1:
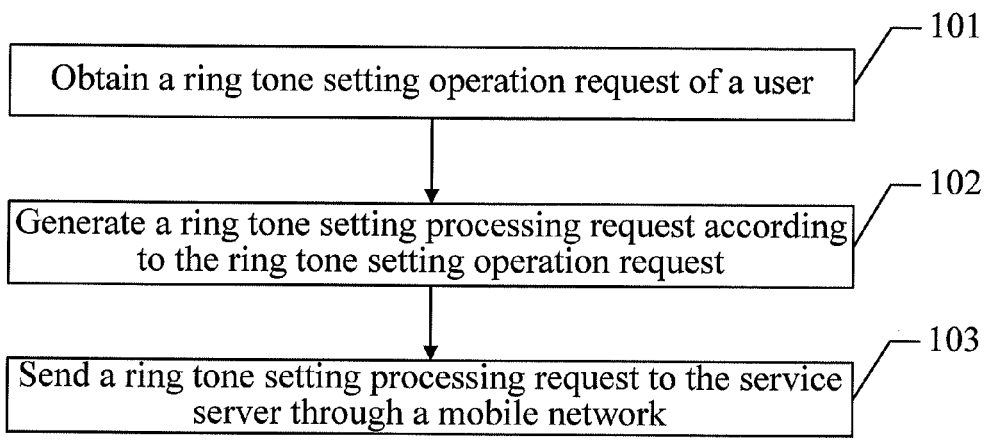
FIG. 1 is a schematic diagram of a service processing method according to an embodiment of the present invention.

As shown in FIG. 1, a service processing method in an embodiment of the present invention includes the following steps:

Step 101: Obtain a ring tone setting operation request from a user.

When the user expects to set his/her customized ring back tone service, the user sends a ring tone setting operation request to the management client in the user terminal through an input operation such as pressing a key. The operation request carries parameters such as an operation type and operation object.

102: Generate a ring tone setting processing request according to the ring tone setting operation request.

After receiving the ring tone setting operation request from the user, the management client generates the corresponding ring tone setting processing request according to the ring tone setting operation request. The generation process will be elaborated in the subsequent embodiments.

The ring tone setting processing request in this embodiment may include:

a ring tone setting query request, adapted to query the current ring tone setting of the user;

a ring tone setting adding request, adapted to add one or more ring tone triggering conditions;

a ring tone setting deleting request, adapted to delete one or more ring tone triggering conditions; or a ring tone setting modifying request, adapted to update existing ring tone triggering conditions.

It is understandable that in practical applications, the ring tone setting processing request may be other types of requests, for example, a request for separately operating a certain setting or setting item, or a request for performing a special operation. The type of the ring tone setting processing request is not limited herein.

It should be noted that the mode of encapsulating a ring tone setting operation request may be different from the mode of encapsulating a ring tone setting processing request. The ring tone setting operation request may be a message transmitted inside the user terminal, but the ring tone setting processing request may be a message transmitted between the management client and the service server. In this embodiment, the management client receives the ring tone setting operation request input by the user from the inputting module of the user terminal, and then encapsulates the ring tone setting operation request to generate a ring tone setting processing request.

It is understandable that in practical applications, the management client may also obtain the ring tone setting processing request from the user. That is, in this case, the user inputs the ring tone setting operation request through the inputting module of the user terminal. The ring tone setting operation request is encapsulated by another module, such as the transmission encapsulating module, in the user terminal to obtain a ring tone setting processing request. In this way, the management client may obtain the ring tone setting processing request of the user.

If the management client directly obtains the ring tone setting processing request from the user in step 101 in this embodiment, step 102 is omissible. In practical applications, as regards whether the management client needs to perform the generating process of the ring tone setting processing request or not, step 102 serves as a reference, and this embodiment does not impose any limitation. In the subsequent embodiments, a case that the management client needs to perform the generating process of the ring tone setting processing request is taken as an example for illustration.

103. Send a ring tone setting processing request to the service server through a mobile network.

After generating the ring tone setting processing request, the management client may send the ring tone setting processing request to the service server through the mobile network.

In this embodiment, the mobile network may be a Global System for Mobile Communications (GSM) network, or Code Division Multiple Access (CDMA) network, or Wideband Code Division Multiple Access (WCDMA) network, or Time Division-Synchronous Code Division Multiple Access (TD-SCDMA) network, or CDMA2000 network, or Worldwide Interoperability for Microwave Access (WiMax) network, or other mobile networks. The specific network type is not limited herein.

In this embodiment, a logical communication interface is created between the management client and the service server, and the logical communication interface in the management client may invoke the physical interface of the user terminal to communicate with the service server. The communication between the management client and the service server is performed on the application layer. For example, in a General Packet Radio Service (GPRS) network, the data sent by the management client arrives at the service server after passing through a Gateway General Packet Radio Service Support Node (GGSN) and a Serving General Packet Radio Service Support Node (SGSN). The foregoing description is only an example for describing the communication between the management client and the service server. It is understandable that in practical applications, for different mobile networks, the process of communication between the management client and the service server and the network elements traversed by the communication may vary, which are not limited herein.

It should be noted that the management client in this embodiment is located in the user terminal, and the management client sends data to the service server through the mobile network by invoking the communication interface of the user terminal; the network address of the service server is preset in the management client, or is obtained in advance, and therefore, the data can be sent according to the network address.

In this embodiment, the management client sends the corresponding ring tone setting processing request to the service server directly through the mobile network after receiving the user's ring tone setting operation request, with no need to access the website specified by the operators. Therefore, the direct interaction between the management client and the service server can enable the user to more conveniently set the ring tone at any time, without being affected by failure of the website.

Secondly, because the management client directly communicates with the service server with no need to access the site, the management client receives no information unrelated to the ring tone setting from the service server, thereby reducing unnecessary network traffic.

Finally, in this embodiment, the management client interacts with the service server through a mobile network, without creating an Internet connection to the service server. The features of the mobile network ensure that security of the mobile network is higher than that of the Internet. Therefore, the ring tone setting performed through the mobile network in this embodiment of the present invention effectively improves system security.

Figure 2:
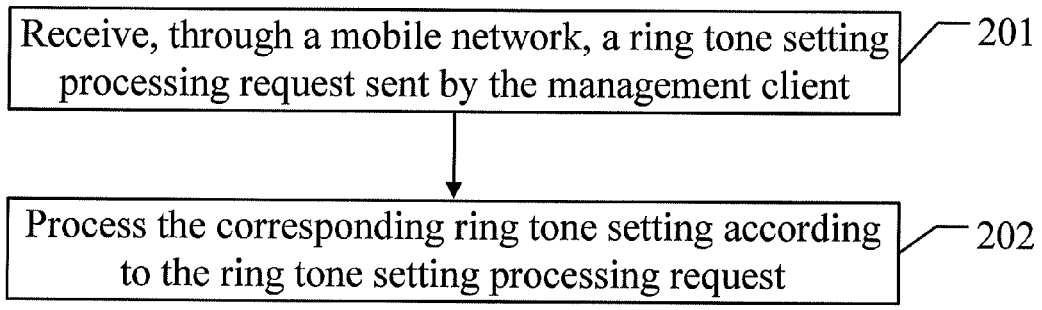
FIG. 2 is a schematic diagram of a service processing method according to an embodiment of the present invention.

As the service processing method in an embodiment of the present invention is described above from the perspective of the management client, the following describes a service processing method in an embodiment of the present invention from the perspective of the service server. As shown in FIG. 2, a service processing method in an embodiment of the present invention includes the following steps:

201: Receive, through a mobile network, a ring tone setting processing request sent by the management client.

In this embodiment, a network address of the service server is set in the management client. Therefore, the management client may send the ring tone setting processing request to the service server through the mobile network. The service server in this embodiment may receive the ring tone setting processing request which is sent by the management client and transmitted by the corresponding mobile network element such as the Serving General Packet Radio Service Support Node (SGSN).

Corresponding to the ring tone setting processing request sent by the management client, the ring tone setting processing request received by the service server in this embodiment may include:

a ring tone setting query request, adapted to query the current ring tone setting of the user;

a ring tone setting adding request, adapted to add one or more ring tone triggering conditions;

a ring tone setting deleting request, adapted to delete one or more ring tone triggering conditions; or a ring tone setting modifying request, adapted to update existing ring tone triggering conditions.

It is understandable that in practical applications, the ring tone setting processing request may also be other types of requests, and is not limited herein.

202: Process the corresponding ring tone setting according to the ring tone setting processing request.

After receiving the ring tone setting processing request, the service server may process the user's ring tone setting according to the request, for example, querying the ring tone setting, adding a ring tone triggering condition, deleting a ring tone trigger condition, updating a tone triggering condition, or other types of operation.

It should be noted that before processing the ring tone setting, the service server may authenticate the user. After the user passes the authentication, the service server parses the corresponding request message, and processes the corresponding ring tone setting of the user according to the user information, operation type and setting parameters in the message.

In this embodiment, the service server not only authenticates the user, but also authenticates the user terminal and/or management client according to the authentication policy of the operators; or authenticates any two of these items: the user, the management client, and the user terminal; or authenticates all the three items. The service server performs subsequent operations only after the authentication succeeds.

In this embodiment, the service server may receive, through the mobile network, the ring tone setting processing request sent by the management client, and perform corresponding processing. Therefore, the direct interaction between the management client and the service server can enable the user to more conveniently set the ring tone anytime, without being affected by failure of the website.

Secondly, because the management client directly communicates with the service server with no need to access the site, the management client receives no information unrelated to the ring tone setting from the service server, thereby reducing unnecessary network traffic.

Finally, in this embodiment, a mobile network connection instead of Internet connection is created between the management client and the service server. The features of the mobile network ensure that security of the mobile network is higher than that of the Internet. Therefore, the ring tone setting performed through the mobile network in this embodiment of the present invention effectively improves system security.

Figure 3:
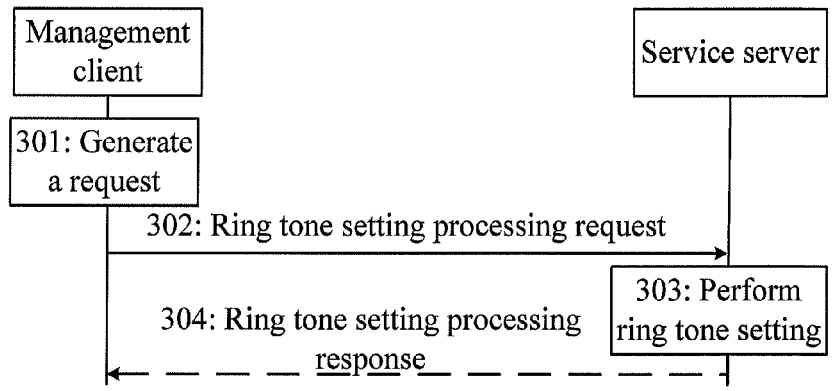
FIG. 3 is a schematic diagram of a service processing method according to another embodiment of the present invention.

For better understanding, the following elaborates the service processing method in this embodiment of the present invention from the perspective of interaction between the management client and the service server. As shown in FIG. 3, a service processing method in another embodiment of the present invention includes the following steps:

301: The management client generates a ring tone setting processing request.

In this embodiment, when the user expects to set the customized ring back tone service, the user may log in to the management client first. The management client may be a software in the user terminal. After the management client authenticates the user successfully, the user sends a ring tone setting operation request to the management client in the user terminal through an input operation such as pressing a key. The operation request carries parameters such as an operation type and operation object.

After receiving the ring tone setting operation request from the user, the management client generates the corresponding ring tone setting processing request according to the ring tone setting operation request. The request may be generated in any of the following modes:

A. Through Hyper Text Transport Protocol (HTTP).

In the mode, the management client may make the parameters of the ring tone setting operation request carried in a message header or message body of an HTTP message, and use the HTTP message as a ring tone setting processing request.

It should be noted that if the parameters in the ring tone setting operation request are described directly through strings, the parameters of the ring tone setting operation request may be carried in the message header or message body of the HTTP message.

If the parameters in the ring tone setting operation request are described through eXtensible Markup Language (XML) or through a SOAP protocol, the parameters of the ring tone setting operation request may be carried in the message body of the HTTP message.

B. Through XML Configuration Access Protocol (XCAP).

In the mode, the management client needs to have the functions of an XCAP client, and may generate, in compliance with the XCAP, an XCAP command of an XCAP message format, namely, ring tone setting processing request.

It should be noted that the foregoing two generation modes are put forward for the exemplary purpose only. In practical applications, the ring tone setting processing request may be generated through other different protocols according to the transmission requirements. The protocol type and the generation process are not limited herein.

The ring tone setting processing request in this embodiment may include: a ring tone setting query request, a ring tone setting adding request, a ring tone setting deleting request, or ring tone setting modifying request, or other types of processing requests. The functions of such requests include but not limited to: the user adds a new ring tone setting, the user browses an existing ring tone setting, the user deletes an existing ring tone setting, and the user modifies an existing ring tone setting.

The user may play the ring tone according to the set different attributes and conditions of playing the ring tone, for example, playing the ring tone at a specific time period, or playing the ring tone according to a specific user group.

302. The management client sends the generated ring tone setting processing request to the service server through the mobile network.

In this embodiment, after generating the ring tone setting processing request, the management client may send the ring tone setting processing request to the service server through the mobile network. Specifically, the mobile network may be a GSM network, or CDMA network, or other mobile networks. The network type is not limited herein.

It should be noted that the management client in this embodiment is located in the user terminal, and the management client sends data to the service server through the mobile network by invoking the communication interface of the user terminal; the network address of the service server is preset in the management client, or is obtained in advance, and therefore, the data can be sent according to the network address.

303: The service server performs the corresponding processing according to the received ring tone setting processing request.

In this embodiment, a network address of the service server is set in the management client. Therefore, the management client may send the ring tone setting processing request to the service server through the mobile network. The service-specific server in this embodiment may receive the ring tone setting processing request transmitted from the corresponding mobile network element such as SGSN.

After receiving the ring tone setting processing request, the service server may authenticate the user and/or management client before processing the corresponding ring tone setting; and, after the authentication succeeds, process the corresponding ring tone setting of the user according to the user information, operation type and setting parameters in the message.

304: The service server feeds back a ring tone setting processing response to the management client through the mobile network.

In this embodiment, after completion of processing the ring tone setting of the user, the service server may feed back a processing response to the management client, for example, feed back a processing result, or, if the user requests browsing the ring tone settings, the service server may feed back the current ring tone settings of the user to the management client.

It should be noted that step 304 in this embodiment is optional. The service-specific server does not necessarily feed back the processing result to the management client. For example, if the user requests deleting a ring tone setting, the service server deletes the corresponding ring tone setting as requested, with no need to return the processing result.

In this embodiment, the service server may receive the ring tone setting processing request sent by the management client, and perform corresponding processing. Therefore, the direct interaction between the management client and the service server may enable the user to more conveniently set the ring tone anytime, without being affected by failure of the website.

Moreover, because the management client directly communicates with the service server with no need to access the site, the management client receives no information unrelated to the ring tone setting from the service server, thereby reducing unnecessary network traffic.

In addition, in this embodiment, a mobile network connection instead of Internet connection is created between the management client and the service server. The features of the mobile network ensure that security of the mobile network is higher than that of the Internet. Therefore, the ring tone setting performed through the mobile network in this embodiment of the present invention effectively improves system security.

Furthermore, in this embodiment, the management client may generate the ring tone setting processing request in multiple modes, which can be adaptable to multiple transport protocols and can improve flexibility of transmitting the ring tone setting processing request.

In practical applications, the ring tone setting processing request may include any one of a ring tone setting query request, a ring tone setting adding request, a ring tone setting deleting request, and a ring tone setting modifying request. For better understanding of the present invention, the following describes how to process such exemplary types of requests. According to different modes of generating the ring tone setting processing request, the service processing method in this embodiment comes in the following cases:

I. Service Processing in an HTTP Mode (1) Processing a Ring Tone Setting Query Request.

In this mode, when the user expects to query his/her own ring tone settings, the user can input a ring tone setting operation request to the management client. The management client generates the corresponding ring tone setting query request that may carry parameters including: a user identifier, query type, and setting type.

The user identifier is an identifier of the user who initiates the ring tone setting operation request, the query type is a type of the ring tone setting that the user who sends the ring tone setting operation request expects to query, and the setting type is a range of the ring tone settings that the user who sends the ring tone setting operation request expects to query.

In practical applications, the ring tone setting query request may comprise more parameters, including the following parameters:

TABLE 1

| Parameter name | Composition | Can the parameter value be null? | Remarks |
| --- | --- | --- | --- |
| User identifier userid | Digit | No | User number, which may be a mobile phone number of the user or a Mobile Station international Integrated Service Digital Network (MSISDN) number |
| User access code randomsessionkey | Digit, letter | Yes | User access code |
| user terminal identifier sid | Digit | Yes | user terminal number, which may be an International Mobile Equipment Identifier (IMEI) number of the user terminal |
| Query type flag | Digit | Yes | The query types, when the parameter value is null, query type 2 below applies by default:<br>1-personal customized ring back tone setting (including ring tone setting and ring tone box setting);<br>2-personal customized ring back tone setting and setting of the customized ring back tone of the group to which the user belongs;<br>3-setting of customized ring back tone of the group to which the user belongs;<br>4-ring tone box setting of the personal customized ring back tone setting; and<br>5-ring tone setting of the personal customized ring back tone setting. |
| Setting type settype | Digit | Yes | Setting types include: 0-all settings; and 1-personal settings except the default ring tone of the system |
| Ring tone setting identifier customizeid | Digit | Yes | ring tone setting identifier, there may be more than one |

The parameters shown in Table 1 are for the exemplary purpose only. In practical applications, other parameters may be added, which are not limited herein.

The management client may generate the corresponding ring tone setting query request according to HTTP, for example, by reference to the parameter structure in Table 1. In practical applications, the ring tone setting query request may be "http://10.70.119.108:80/spservice/querysettonebysp.do? userid=13811112222&sid=358973017867744&flag=1& settype=0".

The following parameters are carried in the foregoing tone setting query request: the service server's address and port "10.70.119.108:80", request type "query", user number "userid=13811112222", user terminal identifier "sid=358973017867744", query type "flag=1", and setting type "settype=0". The ring tone setting query request is generated by carrying the parameters, through strings, in the message header of the HTTP message. The mode of carrying the parameters in the message body and the mode of describing the parameters through XML, are similar, and are not repeatedly described here.

The foregoing ring tone setting query request is transmitted to the corresponding service server through an interface of the management client in the mobile network, and then the service server performs the corresponding query operation, and returns the query result to the management client. The query result includes the setting item identifier and the setting item content. If the request sent by the client includes the setting type (settype), it indicates that all settings or all personal settings are requested, and the server needs to return all setting information; if the request does not include the setting type (settype) but includes one or more setting item identifiers, it indicates that the setting contents of one or more setting items are requested, and the server queries the setting item contents according to the setting item identifier and returns the relevant setting item contents to the user terminal.

In this embodiment, the ring tone settings returned by the service server may be described through XML, for example:

```
<?xml version="1.0" encoding="GBK"?>
<!ELEMENT personalsettone (settone*)| returncode >
<!ELEMENT settone (name+,value+)>
<!-parameter name
specialtype   ring tone setting type
tonecode      ring tone ID
looptype      ring tone play type    0-sequential; 1-random
timetype      type of play time
starttime     start time
endtime       end time
specialphone  calling number
desc          description information
customizeid   setting ID
boxflag       ring tone setting type
-- >
<!ELEMENT name (#PCDATA)>
<!-parameter value-->
<!ELEMENT value (#PCDATA)>
<!-error code-->
<!ELEMENT returncode (#PCDATA)>
```

It should be noted that in this embodiment, in the HTTP mode, the ring tone setting may be directly transmitted to the ring tone management client through HTTP, or the client downloads the corresponding ring tone setting file to a client side, and the specific mode is not limited herein.

It should be noted that in this embodiment, the user obtains the ring tone setting from the service server by actively initiating a query request. In practical applications, the service server may synchronize the user's ring tone setting with the management client as triggered by certain conditions or periodically. For example, the user's ring tone setting may be synchronized weekly between the service server and the management client through negotiation; or, after the user modifies the ring tone setting by logging in to the website specified by the operators through a computer, the service server may also actively synchronize the ring tone setting with the management client, and therefore, the user can query the current ring tone settings directly through the management client, with no need to send any query request.

(2) Processing a Ring Tone Setting Adding Request.

In this mode, when the user expects to add new ring tone settings, the user inputs a ring tone setting operation request to the management client. The management client generates the corresponding ring tone setting adding request that may carry parameters including: user identifier and setting parameters.

The user identifier is the identifier of the user who sends the ring tone setting operation request.

In this embodiment, the setting parameters in the ring tone setting adding request may further include at least one of these parameters: ring tone identifier, time setting parameter, status setting parameter, and number parameter.

The setting parameters in this embodiment are not limited to the time setting parameter, status setting parameter and number parameter mentioned above. In practical applications, according to the different policies of the operators, the setting parameters may include other types of parameters, which are limited herein.

In practical applications, the ring tone setting adding request may carry more parameters, including the following parameters:

TABLE 2

| Parameter name | Composition | Can the parameter value be null? | Remarks |
|---|---|---|---|
| User identifier userid | Digit | No | The user number, which may be a mobile phone number of the user or an MSISDN number |
| User access code randomsessionkey | Digit, letter | Yes | User access code |
| user terminal identifier sid | Digit | Yes | The user terminal number, which may be IMEI number of the user terminal |
| Ringtone attribute specialtype | Digit | No | 1-default ring tone; 2-personal ring tone; 3-group ring tone |
| Circulative play mode looptype | Digit | Yes | Circulative play mode of tones: 0-sequential; 1-random |
| Ring tone type boxflag | Digit | Yes | The following ring tone types exist. If the parameter value is null, the ring tone type 0 applies by default: 0-set ordinary ring tone; 1-set music box; 2-set ring tone group (supporting only usdpb064) |
| Ring tone identifier tonecode | Digit | No | Ordinary ring tone, ring tone group, or music box code. For ring tone group or music box, only one code can be input. Multiple ordinary tones are delimited by "\|" |

TABLE 2-continued

| Parameter name | Composition | Can the parameter value be null? | Remarks |
|---|---|---|---|
| Number parameter specialphone | Digit, letter | Yes | This parameter specifies the numbers to which the corresponding ring tone is played. When the Specialtype value is 2, it indicates a user number; When the Specialtype value is 3, it indicates a serial number of a group |
| Time setting timerule | Array | Yes | Ring tone play time rule |
| Other setting statusrule | Array | Yes | Rule of playing ring tones according to different statuses |
| Status ring tone type statustype | Digit | Yes | Playing ring tones according to different statuses 0-normal ring tone (default); 1-power-off ringback tone; 2-ringback tone for call forwarding without conditions; 3-ringback tone for called user outside the service area |
| Description | Character | Yes | Setting description |
| Setting attribute flag | Digit | Yes | Time segments overlap 0-prompt error and reject the setting 1-overwrite the existing settings; 2-add a ring tone wheel (valid all the day by default); 3-if time segments overlap, use a new setting time segment to divide the existing settings |

The time setting "timerule" in the foregoing Table 2 may include the following parameters:

TABLE 3

| Parameter name | Composition | Can the parameter value be null? | Remarks |
|---|---|---|---|
| Time type timetype | Digit | No | Time type 0-everyday time segment; 1-date time segment; 2-all day time segment; 3-weekly time segment; 4-montly time segment; 5-yearly time segment |
| Start time starttime | Digit | No | start time yyyy-mm-dd hh:mm:ss |
| End time endtime | Digits | No | end time yyyy-mm-dd hh:mm:ss |

In Table 2 above, other setting "statusrule" may be the rule of playing ring tones according to the user status, or rule of playing ring tones according to the geographic location of the user. For example, the rule of playing ring tones according to the user status may include the following parameters:

TABLE 4

| Parameter name | Composition | Can the parameter value be null? | Remarks |
|---|---|---|---|
| Presence status ring tone type presencetone | Digit or Boolean value | No | 0-play ring tones according to different presence statuses; 1-convert the presence information into ring tones playing |
| Presence status presence | Digit, letter | No | Presence status information description |

Or, the rule of playing ring tones according to the user status may include the following parameters:

TABLE 5

| Parameter name | Composition | Can the parameter value be null? | Remarks |
|---|---|---|---|
| Location ring tone type loctone | Digit or Boolean value | No | 0-play according to different location statuses; 1-convert the location information into ring tones playing |
| Location status location | Digit, letter | No | Location status information description |

The parameters shown in the foregoing Table 2 to Table 5 are for the exemplary purpose only. In practical applications, other parameters may also be added, which are not limited herein.

After obtaining the ring tone setting operation request, the management client may generate the corresponding ring tone setting adding request according to HTTP. The structure of the ring tone setting adding request is similar to the structure of the foregoing ring tone setting query request, and is not repeatedly described here.

After the foregoing ring tone setting addition request is transmitted to the corresponding service server through the interface of the management client in the mobile network, the service server performs the corresponding adding operation, namely, modifies the corresponding ring tone settings according to the ring tone identifier, time play setting information, and user play setting information specified in the ring tone setting adding request.

It is understandable that after completion of adding the ring tone setting, the service server may return the processing result to the management client. The processing result may include an identifier indicating success or failure of the operation, and causes for operation failure. For example, "0" is used to indicate operation success, and different codes are used to indicate: the user is invalid, the ring tone code does not exist, the setting time segment overlaps with the existing time segment, or the setting time is null.

If the ring tone setting is added successfully, and the request is set by the user as: playing the customized ring back tone in 8:00-9:00 every morning, when a call is originated to the user, the service server queries, according to the time play settings of the called user, whether the current time falls within the set range. If the current time falls within 8:00-9:00 a.m., the service server triggers the ring back tone playing server to play the ring back tone customized by the called user to the calling user; otherwise, the service server plays the ring back tone according to the existing setting rule.

(3) Processing a Ring Tone Setting Modifying Request.

The processing of the ring tone setting modifying request and the parameters in the ring tone setting operation request are similar to those in the processing of the foregoing ring tone setting adding request. One or more parameter setting item identifiers "customizeid" are required to be added on the basis of the foregoing Table 2 to indicate the ID of the existing ring tone setting. The composition of the parameters may be digit or character, and the value of at least one of the parameters is not null. The management client modifies the ring tone settings corresponding to the parameter. If multiple setting item identifiers are carried, the corresponding ring tone setting parameters such as ring tone play time are subsidiary to a setting item.

It should be noted that in this embodiment, if service server fails to find the corresponding setting item identifier, it is regarded that the request is a request for adding a new ring tone setting item, and the service server performs the operation of adding a new ring tone setting item.

In this embodiment, the ring tone setting modifying request may further include parameters to be modified, namely, specific parameters of the ring tone setting to be modified as required by the user who sends the ring tone setting operation request. The parameters to be modified may include: time setting parameter, status setting parameter, ring tone identifier, number parameter, or other parameters to be modified.

(4) Processing a Ring Tone Setting Deleting Request.

When the user expects to delete a ring tone setting, the user may input an operation request for deleting a ring tone setting to the management client. The management client sends a ring tone setting deleting request to the service server. The ring tone setting deleting request carries a user identifier and an identifier of the ring tone setting to be deleted.

The user identifier is the identifier of the user who sends the ring tone setting operation request, and the identifier of the ring tone setting to be deleted is the identifier of the ring tone setting to be deleted as required by the user who sends the ring tone setting operation request.

In this embodiment, the ring tone setting deleting request carries parameters to be deleted, namely, specific parameters of the ring tone setting to be deleted as required by the user who sends the ring tone setting operation request. The parameters to be deleted may include: time setting parameter, status setting parameter, ring tone identifier, number parameter, or other parameters to be deleted.

In practical applications, the ring tone setting query request may carry more parameters, including the parameters as shown in following Table:

TABLE 6

| Parameter name | Composition | Can the parameter value be null? | Remarks |
|---|---|---|---|
| userid | Digit | No | The user number, may be a mobile phone number of the user or an MSISDN number |
| randomsessionkey | Digits, letter | Yes | User access code |
| user terminal identifier sid | Digit | Yes | The user terminal identifier may be IMEI of the user terminal |
| customizeid | Digit | No | Ring tone setting ID |

The parameters shown in the foregoing Table 6 are for the exemplary purpose only. In practical applications, other parameters may be added, which are not limited herein.

After obtaining the ring tone setting operation request for deleting the ring tone setting, the management client may generate the corresponding ring tone setting deleting request according to HTTP. According to the foregoing Table 6, in practical applications, the ring tone setting deleting request may be "http://10.70.119.108:80/spservice/delsettonebysp.do? userid=13811112222&sid=358973017867744& customizeid=65".

The following parameters are carried in the foregoing ring tone setting deleting request: the service server's address and port "10.70.119.108:80", request type "del", user number "userid=13811112222", user terminal code "sid=358973017867744", and ID "customizeid=65" of the ring tone setting to be deleted. The ring tone setting deleting request is generated by carrying the parameters into the message header of the HTTP message through strings. The mode of carrying the parameters in the message body and the mode of describing the parameters through XML are similar, and are not repeatedly described here.

The foregoing ring tone setting deleting request is transmitted to the corresponding service server through an interface of the management client in the mobile network, and then the service server performs the corresponding deletion operation and returns the deletion result to a management server. The deletion result may specifically include an identifier indicating success or failure of the operation, and causes for operation failure. For example, "0" is used to indicate operation success, and different codes are used to indicate: the user is invalid, or the setting record does not exist.

It should be noted that in the HTTP mode, the service server may be a customized ring back tone service platform, or another device with similar functions.

II. Service Processing in an XCAP Mode

The service processing in the HTTP mode is described above, and the service processing performed in the XCAP mode is described in the following. When an XCAP protocol is applied, it is required that both the management client and the service server can support the XCAP protocol, and that the service server needs to have the functions of an XCAP server, and store and manage the ring tone settings in XML files. In the mode, the management client can modify a specific setting item more conveniently, less information data is transmitted between the management client and the service server, and the unnecessary network traffic is further reduced.

It should be noted that in the mode, the service server sets the ring tones of a user as XML files and manages them in a tree structure according to the XCAP protocol. For example, for user Tom, the XCAP resource address of the tone settings of Tom can be regarded as: http://server.crbt.com/service-setting/users/Tom/prem1, indicating that the root address of the service is server.crbt.com, the application identifier is service-setting, the user identifier is Tom, and the XML file of the tone setting is prem1. For example, in the ring tone setting item 522 of Tom, the ring tones in the personal tone group 100100000002 may be played to user 13800000001 sequentially in 8:30-12:00 and 13:30-18:00 every day. The ring tone setting file prem1 is:

```
<?xml version="1.0" encoding="GBK"?>
<personalsettone>
<settone customizeid="522">
< specialtype >2</ specialtype >
   <ringtones>
<one tonecode="100100000002" />
</ringtones>
< looptype >0</ looptype >
< timerules >
```

-continued

```
<rule id="rule1">
< timetype >0</ timetype >
< starttime >08:30:00</ starttime >
< endtime >12:00:00</ endtime >
</rule>
<rule id="rule2">
< timetype >0</ timetype >
< starttime >13:30:00</ starttime >
< endtime >18:00:00</ endtime >
</rule>
</ timerules >
< specialphone >
<one phone-number="13800000001" />
</ specialphone >
< desc > for special friend </ desc >
< boxflag >2</ boxflag >
</settone>
...
</personalsettone>
```

(1) Processing a Ring Tone Setting Query Request.

In the mode, when a user expects to query his/her ring tone settings, the user may input a ring tone setting query operation request to the management client. The operation request may include setting items to be queried.

After obtaining the foregoing ring tone setting operation request, the management client can generate the corresponding ring tone setting query request according to XCAP. The ring tone setting query request may be "GET http://server.crbt.com/service-setting/users/Tom/prem1 HTTP/1.1", where "GET" indicates obtaining.

The foregoing ring tone setting query request is transmitted to the corresponding service server through an interface of the management client in the mobile network, and then the service server performs the corresponding query operation, and returns the query result to the management client. The query result may be an XML file of prem1 which includes the ring tone settings of the user.

In the foregoing example, all ring tone setting information in the prem1 of the user is queried. It should be noted that in practical applications, the user may query a ring tone setting in only one setting item, for example, query the calling number information in the ring tone setting:

"GET http://server.crbt.com/service-setting/users/Tom/prem1/~~/personalsettone/settone [customizeid="522"]/specialphone HTTP/1.1"

In this case, the response message returned to the management client is: HTTP/1.1 200 OK, and the message body carries the corresponding number: <one phone-number="13800000001"/>.

The query process is similar, and is not repeatedly described here.

(2) Processing a Ring Tone Setting Adding Request.

In the mode, when the user expects to add some ring tone settings, the user inputs a ring tone setting operation request to the management client. The operation request may carry the content to be added.

After obtaining the ring tone setting operation request, the management client may generate the corresponding ring tone setting adding request according to XCAP. The ring tone setting adding request may be:

PUT http://server.crbt.com/service-setting/users/Tom/prem1/~~/personalsettone/settone[customizeid="522"]/specialphone/one[phone-number="+8613012345678"]HTTP/1.1;

Content-Type: application/xml-fragment-body;

where "PUT" indicates setting. The specific meaning of the ring tone setting adding request indicates that a number "+8613012345678" is added into the calling numbers.

The foregoing ring tone setting adding request is transmitted to the corresponding service server through an interface of the management client in the mobile network, and then the service server performs the corresponding adding operation, and returns the processing result to the management client. The processing result may include an identifier indicating success or failure of operation, the causes for operation failure, and so on.

(3) Processing a Ring Tone Setting Modifying Request.

The ring tone setting modifying process is similar to the foregoing process of the ring tone setting adding request, and is not repeatedly described here.

(4) Processing a Ring Tone Setting Deleting Request.

When the user expects to delete a ring tone setting, the user inputs a ring tone setting operation request to the management client. The operation request may carry the content to be deleted.

After obtaining the ring tone setting operation request, the management client can generate the corresponding ring tone setting deleting request according to XCAP. The ring tone setting deleting request may be "DELETE http://server.crbt.com/service-setting/users/Tom/prem1/~~/personalsettone/settone[customizeid="522"]HTTP/1.1".

Where "DELETE" indicates deleting, and the specific meaning of the ring tone setting deleting request indicates that the tone setting of prem1 is deleted.

The foregoing ring tone setting deleting request is transmitted to the corresponding service server through an interface of the management client in the mobile network, and then the service server performs the corresponding deletion operation, and returns the processing result to the management server. The processing result may include an identifier indicating success or failure of operation, the causes for operation failure, and so on.

It should be noted that in the XCAP mode, the service server may be a customized ring back tone service platform, or another device with similar functions, and the service server needs to include a XML Database Management System (XDMS) for the user to process the XCAP protocol.

In this embodiment, the service server may receive, through the mobile network, the ring tone setting processing request sent by the management client, and perform corresponding processing. Therefore, the direct interaction between the management client and the service server can enable the user to more conveniently set the ring tone anytime, without being affected by failure of the website.

Secondly, in this embodiment, a mobile network connection instead of Internet connection is created between the management client and the service server. The features of the mobile network ensure that security of the mobile network is higher than that of the Internet. Therefore, the ring tone setting performed through the mobile network in this embodiment of the present invention effectively improves system security.

Finally, in this embodiment, the management client generates the ring tone setting processing request through the XCAP mode, and interacts with the service server through XCAP protocol. Therefore, a setting parameter in a specific setting item can be added or modified flexibly, the data transmitted between the management client and the service server may be effectively reduced, and the network resources are saved.

It should be noted that in order to improve security of the tone setting processing, an access server may be added in this embodiment of the present invention to authenticate the management client and implement data forwarding between the management server and the service server. Specifically, the service processing method that involves an access server in the embodiment of the present invention comes in the following cases according to the application scenarios.

(1) Processing a Ring Tone Setting Query Request.

In the mode, the access server receives a ring tone setting query request from the management client through a mobile network, and authenticates the management client. If the authentication succeeds, the access server judges whether the ring tone setting of the user corresponding to the management client is stored locally. If the ring tone setting is stored locally, the access server returns the locally stored ring tone setting to the management client through the mobile network; if the ring tone setting is not stored locally, the access server obtains the user's ring tone setting from the service server, and feeds back the ring tone setting that obtained from the service server to the management client through the mobile network.

Figure 4:
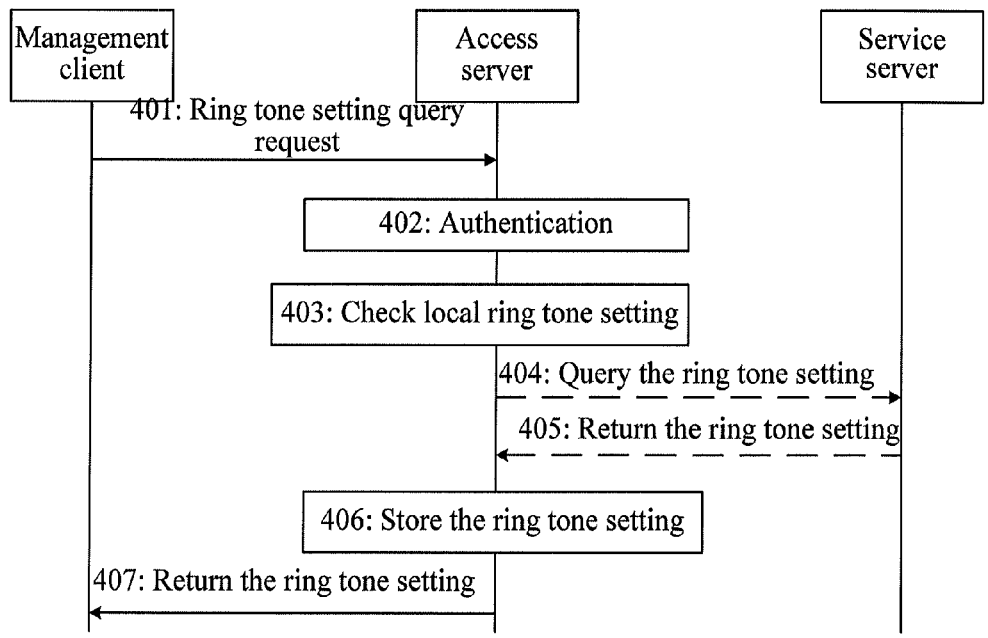
FIG. 4 is a schematic diagram of a service processing method according to another embodiment of the present invention.

For better understanding of the present invention, the following gives an example for describing the foregoing process. As shown in FIG. 4, a service processing method in another embodiment of the present invention includes the following steps:

401: The management client sends a ring tone setting query request to the access server.

In the mode, when the user expects to query his/her tone settings, the user inputs a ring tone setting operation request to the management client. After receiving the ring tone setting operation request, the management client generates the corresponding ring tone setting query request through the HTTP mode or the XCAP mode or other modes. The generation mode is not limited herein.

After the ring tone setting query request is generated, the management client transmits the ring tone setting query request to the access server through the mobile network.

402: The access server authenticates the management client.

After receiving the ring tone setting query request sent by the management client, the access server authenticates the user. If the authentication succeeds, the access server performs subsequent steps; if the authentication fails, the access server feeds back an authentication failure response to the management client.

The specific authentication process may be: judging whether the user is entitled to query the ring tone setting, or other types of authentication. The authentication type is not limited herein.

It should be noted that in this embodiment, the access server not only authenticates the user, but also authenticates the user terminal and/or management client according to the specific authentication policy of the operators; or authenticates any two of these items: the user, the management client, and the user terminal; or authenticates all the three items. The access server performs subsequent operations only after the authentication succeeds.

403: The access server checks the local ring tone setting.

After authenticating the management client successfully, the access server judges whether the ring tone setting required to be queried by the management client is stored by the access server; if the ring tone setting is stored by the access server, the access server directly performs step 407; if the tone setting is not stored by the access server, the access server performs steps 404 to 407.

404: The access server requests and obtains the ring tone setting from the service server.

If the access server does not store the ring tone setting required to be queried by the management client locally, the access server obtains the ring tone setting from the service server, and the obtaining may be specifically: directly forwarding to the service server the ring tone setting query request sent by the management client.

405: The service server returns the ring tone setting to the access server.

After receiving the ring tone setting query request sent by the access server, the service server returns the required ring tone setting to the access server. The detailed query process of the service server is similar to the query process described in the foregoing embodiment, and is not repeatedly described here.

406: The access server stores the ring tone setting.

After receiving the ring tone setting from the service server, the access server stores the ring tone setting locally, whereupon the ring tone setting can be obtained locally from the access server when the management client requests a query for the ring tone setting again.

407: The access server returns the ring tone setting to the management client.

When the access server stores locally the ring tone setting required to be queried by the management client, or after the access server obtains the ring tone setting, which is required to be queried by the management client, from the service server successfully, the access server may return the ring tone setting to the management client.

In this embodiment, the access server is independent of the service server, and serves the special purpose of authenticating the management client. Therefore, for different types of access, different access servers may be used to perform authentication and management, thereby improving flexibility of authentication.

(2) Processing a Ring Tone Setting Modifying Request.

In the mode, the access server receives, through a mobile network, the ring tone setting modifying request sent by the management client, and authenticates the user. If the authentication succeeds, the access server forwards the ring tone setting modifying request to the service server, and receives a ring tone setting modifying response fed back by the service server. The ring tone setting modifying response carries the ring tone setting updated by the service server. The ring tone setting updated by the service-server is stored, and the ring tone setting updated by the service server is fed back to the management client through the mobile network.

It should be noted that in this embodiment, the access server not only authenticates the user, but also authenticates the user terminal and/or management client according to the authentication policy of the operators; or authenticates any two of these items: the user, the management client, and the user terminal; or authenticates all the three items. The access server performs subsequent operations only after the authentication succeeds.

Figure 5:
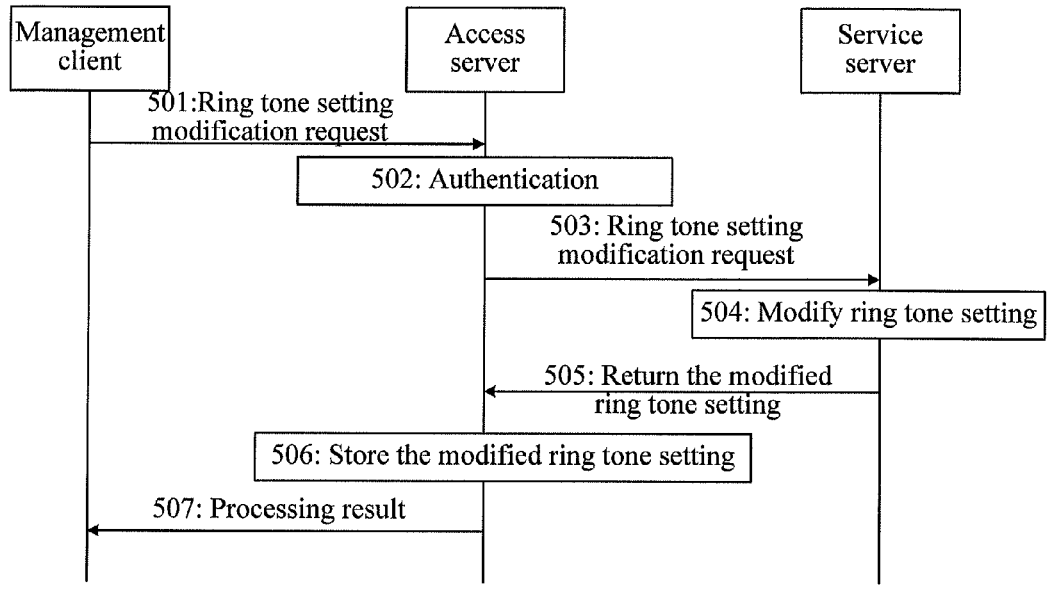
FIG. 5 is a schematic diagram of a service processing method according to another embodiment of the present invention.

For better understanding of the present invention, the following gives an example for describing the foregoing process. As shown in FIG. 5, a service processing method in another embodiment of the present invention includes the following steps:

501: The management client sends a ring tone setting modification request to the access server.

In the mode, when the user expects to modify his/her ring tone settings, the user inputs a ring tone setting operation request to the management client. After receiving the ring tone setting operation request, the management client generates the corresponding ring tone setting modification request through the HTTP mode or the XCAP mode or other modes. The generation mode is not limited herein.

After the ring tone setting modifying request is generated, the management client transmits the ring tone setting modifying request to the access server through the mobile network.

502: The access server authenticates the management client.

After receiving the ring tone setting modifying request sent by the management client, the access server authenticates the user. If the authentication succeeds, the access server performs subsequent steps; if the authentication fails, the access server feeds back an authentication failure response to the management client.

The specific authentication process may be judging whether the user is entitled to query the ring tone setting, or other types of authentication. The authentication type is not limited herein.

It should be noted that in this embodiment, the access server not only authenticates the user, but also authenticates the user terminal and/or management client according to the authentication policy of the operators; or authenticates any two of these items: the user, the management client, and the user terminal; or authenticates all the three items. The access server performs subsequent operations only after the authentication succeeds.

503: The access server sends a ring tone setting modifying request to the service server.

504: The service server modifies the ring tone setting.

After receiving the ring tone setting modifying request sent by the access server, the service server modifies the corresponding ring tone setting according to the ring tone setting modifying request. The detailed modification process is similar to the modification process described in the foregoing embodiment, and is not repeatedly described here.

505: The service server returns the modified ring tone setting to the access server.

After modifying the ring tone setting, the service server returns the modified ring tone setting to the access server.

506: The access server stores the ring tone setting.

After obtaining the ringtone setting modified by the service server from the service server, the access server stores the ring tone setting locally. That is, use the ring tone setting to overwrite an original ring tone setting. In this way, the ring tone setting is updated locally, whereupon the ring tone setting may be directly obtained locally from the access server when the management client requests a query for the ring tone setting again.

507: The access server returns a processing result to the management client.

After obtaining the modified ring tone setting from the service server, the access server returns the processing result to the management client.

In this embodiment, the access server is independent of the service server, and serves the special purpose of authenticating the management client. Therefore, for different types of access, different access servers may be used to perform authentication and management, thereby improving flexibility of authentication.

It should be noted that in the foregoing embodiment, the service server may be a ring tone service management server; the ring tone service management server may manage the ring back tone service and the ringing tone service concurrently. Therefore, the ring tone setting process described above is applicable not only to the customized ring back tone heard by the calling user, but also to the ringing tone heard by the called user, and is not limited here.

Figure 6:
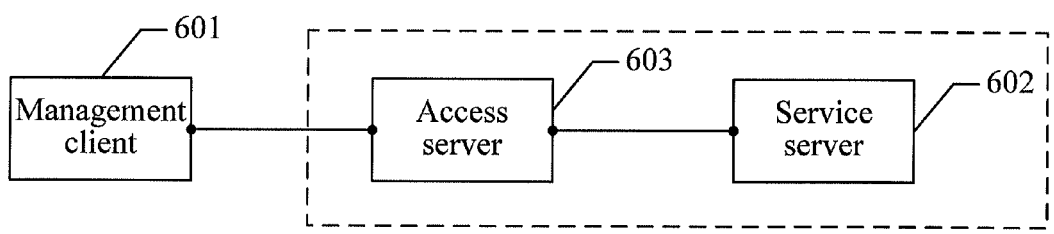
FIG. 6 is a schematic diagram of a communication system according to an embodiment of the present invention.

The following describes a communication system provided in an embodiment of the present invention. As shown in FIG. 6, the communication system in an embodiment of the present invention includes:

The management client 601 is configured to: obtain a ring tone setting operation request from a user, generate a ring tone setting processing request according to the ring tone operation request, and send the ring tone setting processing request to the service server 602 through a mobile network.

It should be noted that the mode of encapsulating a ring tone setting operation request may be different from the mode of encapsulating a ring tone setting processing request. The ring tone setting operation request may be a message transmitted inside the user terminal, while the ring tone setting processing request may be a message transmitted between the management client 601 and the service server 602. In this embodiment, the management client 601 receives the ring tone setting operation request input by the user from the inputting module of the user terminal, and then encapsulates the ring tone setting operation request to generate a ring tone setting processing request.

It is understandable that in practical applications, the management client 601 may obtain the ring tone setting processing request from the user. In this case, the user inputs the ring tone setting operation request through the inputting module of the user terminal. The ring tone setting operation request is encapsulated by another module such as, a transmission encapsulating module, in the user terminal to make a ring tone setting processing request. In this way, the management client 601 may obtain the ring tone setting processing request of the user.

In this embodiment, if the management client 601 directly obtains the ring tone setting processing request from the user, the process of generating the ring tone setting processing request is not necessarily performed. In practical applications, the embodiment herein imposes no limitation to whether the management client 601 needs to perform the process of generating the ring tone setting processing request or not. In this embodiment, a case that the management client 601 needs to perform the process of generating the ring tone setting processing request is taken as example for illustration.

The service-specific server 602 is configured to: receive the ring tone setting processing request from the management client 601 through the mobile network, and process corresponding ring tone settings according to the ring tone setting processing request.

In this embodiment, the management client 601 is located in the user terminal; and the service server 602 may be a customized ring back tone service platform, or another device with similar functions.

The service server 602 in this embodiment is further configured to return a ring tone setting processing response to the management client 601.

The management client 601 is further configured to receive the ring tone setting processing response fed back by the service server 602.

In the ring tone setting query process, in order to improve security of the ring tone setting processing, the communication system in this embodiment may further include:

an access server 603, configured to: receive a ring tone setting query request from the management client 601 through a mobile network, and authenticate the management client 601; if the authentication succeeds, judge whether the ring tone setting of the user corresponding to the management client 601 is stored locally; if the tone setting is stored locally, feed back the locally stored ring tone setting to the management client 601 through the mobile network; if the ring tone setting is not stored locally, obtain the user's ring tone settings from the service server 602, and feed back the ring tone settings obtained from the service server 602 to the management client 601 through the mobile network.

In the ring tone setting modification process, in order to improve security of the ring tone setting processing, the communication system in this embodiment may further include:

an access server 603, configured to: receive, through the mobile network, the ring tone setting modifying request sent by the management client 601, and authenticate the management client 601; if the authentication succeeds, forward the ring tone setting modifying request to the service server 602, and receive a ring tone setting modifying response fed back by the service server 602, where the ring tone setting modifying response carries the ring tone setting updated by the service server 602; store the ring tone setting updated by the service server 602, and feed back the ring tone setting updated by the service server 602 to the management client 601 through the mobile network.

For better understanding of the present invention, the following describes interaction between network elements in the foregoing communication system, by taking a ring tone setting query process as an example:

When the user expects to query his/her ring tone setting, the user inputs a ring tone setting operation request to the management client 601. After receiving the foregoing ring tone setting operation request, the management client 601 generates the corresponding ring tone setting query request through the HTTP mode or the XCAP mode or other modes. The generation mode is not limited herein.

After the tone setting query request is generated, the management client 601 transmits the ring tone setting query request to the access server 603 through the mobile network.

After receiving the ring tone setting query request sent by the management client 601, the access server 603 authenticates the management client 601. If the authentication succeeds, the access server performs subsequent steps; if the authentication fails, the access server feeds back an authentication failure response to the management client 601.

The specific authentication process may be: judging whether the management client 601 is entitled to query the ring tone setting, or other types of authentication. The authentication type is not limited herein.

It should be noted that, according to the authentication policy of the operators, the access server may also authenticate the user and/or user terminal; or authenticate any two of these items: the user, the management client, and the user terminal; or authenticate all the three items. The access server performs subsequent operations only after the authentication succeeds. Therefore, for different operators, different authentication modes may be chosen, thereby improving flexibility of authentication.

After authenticating the management client 601 successfully, the access server 603 judges whether the access server 603 stores locally the ring tone setting required to be queried by the management client 601; if the access server does not store the ring tone setting locally, the access server 603 obtains the ring tone setting from the service server 602, and the obtaining is specifically: directly forwarding the ring tone setting query request, which is sent by the management client 601, to the service server 602.

After receiving the ring tone setting query request sent by the access server 603, the service server 602 returns the ring tone setting required to be queried to the access server 603.

After obtaining the ring tone setting from the service server 602, the access server 603 stores the ring tone setting locally, whereupon the ring tone setting can be directly obtained locally from the access server 603 when the management client 601 requests a query for the ring tone setting again.

After the access server 603 stores locally the ring tone setting required to be queried by the management client 601, or the access server 603 obtains the ring tone setting, which is required to be queried by the management client 601, from the service server 602 successfully, the access server 603 returns the ring tone setting to the management client 601.

It should be noted that the access server 603 may be either integrated with or independent of the service server 602 in this embodiment. If they are independent, for different access modes, different access servers 603 may be used for authentication, thereby improving flexibility of authentication.

Figure 7:
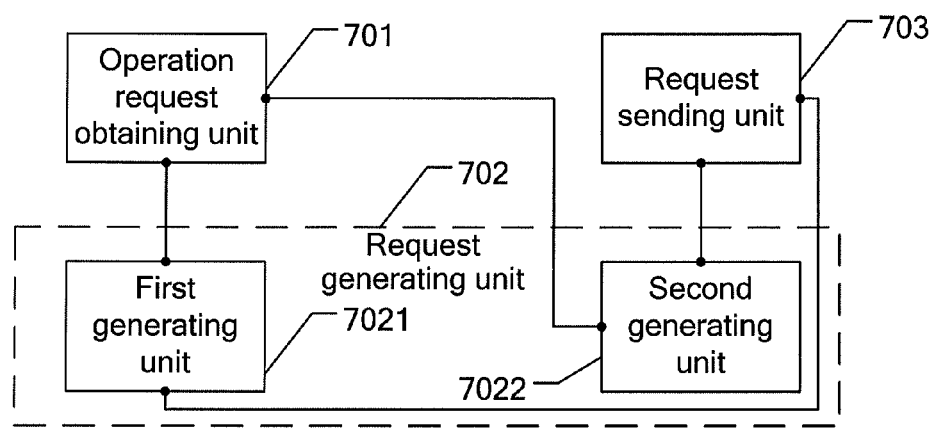
FIG. 7 is a schematic diagram of a management client in an embodiment of the present invention.

The following describes a management client provided in an embodiment of the present invention. As shown in FIG. 7, a management client in an embodiment of the present invention includes:

an operation request obtaining unit 701, configured to obtain a ring tone setting operation request from a user;

a request generating unit 702, configured to generate a ring tone setting processing request according to the ring tone setting operation request obtained by the request obtaining unit 701; and a request sending unit 703, configured to send the ring tone setting processing request generated by the request generating unit 702 to a service server through a mobile network so that the service server can perform corresponding processing according to the ring tone setting processing request.

It should be noted that in this embodiment, the operation request obtaining unit 701 may directly obtain the ring tone setting processing request from the user. For the detailed obtaining mode, refer to the obtaining mode described in the foregoing embodiment. Therefore, the management client in this embodiment does not necessarily need the request generating unit 702, namely, it is not required to generate the ring tone setting processing request again. In practical applications, as regards whether the management client itself needs to perform the process of generating the ring tone setting processing request or not, this embodiment does not impose any limitation. In this embodiment, a case that the management client itself needs to perform the process of generating the ring tone setting processing request, namely, a case that the request generating unit 702 is needed to generate the ring tone setting processing request is taken as an example for illustration.

When the request generating unit 702 is needed in the embodiment, the request generating unit 702 may include at least one of the following units:

a first generating unit 7021, configured to: make a message header or message body of an HTTP message carry parameters in an ring tone setting operation request, and use the HTTP message as a ring tone setting processing request; and a second generating unit 7022, configured to: encapsulate the XCAP resource address and parameters in the ring tone setting operation request into an XCAP command, and use the XCAP command as a ring tone setting processing request.

Corresponding to the foregoing first generating unit 7021 or second generating unit 7022, the request sending unit 703 in this embodiment uses HTTP or XCAP to send the ring tone setting processing request to the service server through the mobile network.

The management client in this embodiment may further include:

A response receiving unit, configured to receive a ring tone setting processing response fed back by the service server through the mobile network.

For better understanding of the present invention, the following describes the collaboration between the units in the management client in this embodiment, by taking an application scenario as an example:

When a user expects to set his/her customized ring back tone service, the user sends a ring tone setting operation request to the operation request obtaining unit 701 in the management client through an input operation such as pressing a key. The operation request carries parameters such as an operation type and operation object.

After the operation request obtaining unit 701 in the management client obtains the ring tone setting operation request from the user, the request generating unit 702 generates a ring tone setting processing request corresponding to the ring tone setting operation request through the HTTP mode or the XCAP mode or other modes. The generation mode is not limited herein.

After the request generating unit 702 in the management client generates the ring tone setting processing request, the request sending unit 703 may send the ring tone setting processing request to the service server through the mobile network.

It should be noted that the management client in this embodiment is located in the user terminal, and the management client sends data to the service server through the mobile network by invoking the communication interface of the user terminal; the network address of the service server is preset in the management client, or is obtained from the user terminal, and therefore, the data can be sent according to the network address.

In this embodiment, after the operation request obtaining unit 701 receives the user's ring tone setting operation request, the request generating unit 702 generates the corresponding ring tone setting processing request, and the request sending unit 703 sends the ring tone setting processing request to the service server directly through the mobile network, with no need to access the website specified by the operators. Therefore, the direct interaction between the management client and the service server can enable the user to more conveniently set the ring tone at any time, without being affected by failure of the website.

Secondly, because the management client directly communicates with the service server with no need to access the site, the management client receives no information unrelated to the ring tone setting from the service server, thereby reducing unnecessary network traffic.

Finally, in this embodiment, the management client interacts with the service server through a mobile network, without creating an Internet connection to the service server. The features of the mobile network ensure that security the mobile network is higher than that of the Internet. Therefore, the tone setting performed through the mobile network in this embodiment of the present invention effectively improves system security.

Figure 8:
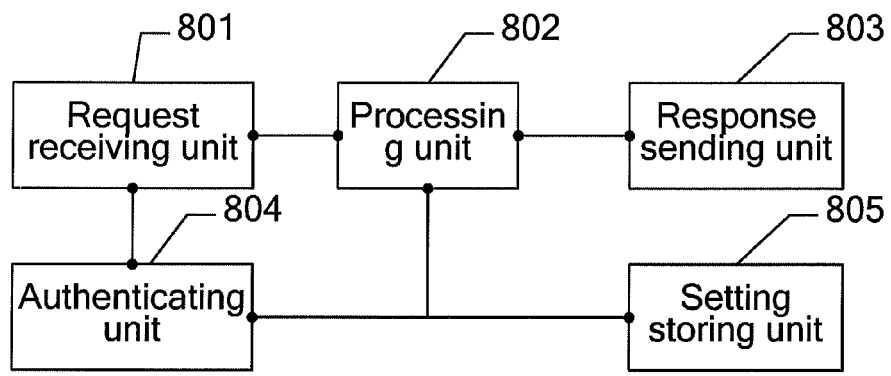
FIG. 8 is a schematic diagram of a service processing apparatus according to an embodiment of the present invention.

The following describes a service processing apparatus provided in an embodiment of the present invention. As shown in FIG. 8, a service processing apparatus in an embodiment of the present invention includes:

a request receiving unit 801, configured to receive, through a mobile network, a ring tone setting processing request sent by a management client; and a processing unit 802, configured to process corresponding ring tone settings according to the ring tone setting processing request received by the request receiving unit 801.

The service processing apparatus in this embodiment may further include:

a response sending unit 803, configured to feed back a ring tone setting processing response to the management client through the mobile network.

The service processing apparatus in this embodiment may further include:

an authenticating unit 804, configured to: authenticate at least one of the following: the user, the user terminal, and the management client; and trigger the processing unit 802 to perform corresponding operations if the authentication succeeds.

The service processing apparatus in this embodiment may further include:

a setting storing unit 805, configured to store the ring tone setting processed by the processing unit 802.

For better understanding of the present invention, the following describes the collaboration between the units in the service processing apparatus in this embodiment, by taking an application scenario as an example:

In this embodiment, the management client may send a ring tone setting processing request to the request receiving unit 801 in the service processing apparatus through the mobile network. The request receiving unit 801 in the service processing apparatus in this embodiment may also receive the ring tone setting processing request sent by the management client.

After the request receiving unit 801 in the service processing apparatus receives the ring tone setting processing request, the processing unit 802 may process the corresponding user's ring tone setting according to the request, for example, querying the ring tone setting, adding a ring tone setting condition, updating a ring tone setting condition, or other types of operation.

It should be noted that the service processing apparatus in this embodiment may be the service server mentioned in the foregoing embodiment, or a service server that integrates the functions of an access server, which is not limited herein.

The modules in service processing apparatus may be set in one device in an integrated mode or set in different devices independently.

In this embodiment, the request receiving unit 801 in the service processing apparatus may receive, through the mobile network, the ring tone setting processing request sent by the management client, and the processing unit 802 performs corresponding processing. Therefore, the direct interaction between the management client and the service processing apparatus can enable the user to more conveniently set the ring tone anytime, without being affected by failure of the website.

Secondly, because the management client directly communicates with the service processing apparatus with no need to access the site, the management client receives no information unrelated to the tone setting from the service processing apparatus, thereby reducing unnecessary network traffic.

Finally, in this embodiment, a mobile network connection instead of Internet connection is created between the management client and the service processing apparatus. The features of the mobile network ensure that security of the mobile network is higher than that of the Internet. Therefore, the tone setting performed through the mobile network in this embodiment of the present invention effectively improves system security.

Figure 9:
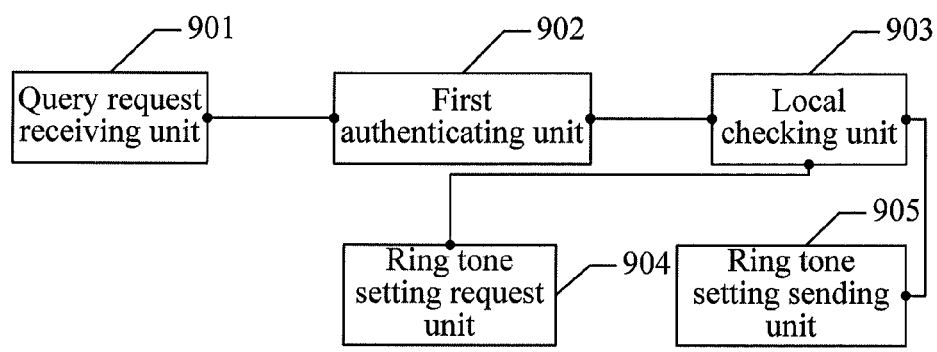
FIG. 9 is a schematic diagram of an access server according to an embodiment of the present invention.

The following describes an access server provided in an embodiment of the present invention. As shown in FIG. 9, an access server applied in a ring tone setting query process in an embodiment of the present invention includes:

a query request receiving unit 901, configured to receive, through a mobile network, a ring tone setting query request sent by a management client;

a first authenticating unit 902, configured to authenticate the management client;

a local checking unit 903, configured to judge whether the ring tone setting of the user corresponding to the management client is stored locally when the first authenticating unit 902 performs the authentication successfully;

a ring tone setting request unit 904, configured to obtain the user's ring tone setting from the service server when the ring tone setting of the user corresponding to the management client is not stored locally; and a ring tone setting sending unit 905, configured to send the locally stored ring tone setting to the management client through a mobile network.

It should be noted that in this embodiment, the first authenticating unit 902 not only authenticates the management client, but also authenticates the user and/or user terminal according to the authentication policy of the operators; or authenticates any two of these items: the user, the management client, and the user terminal; or authenticates all the three items. The subsequent operations are performed only after the authentication succeeds.

Figure 10:
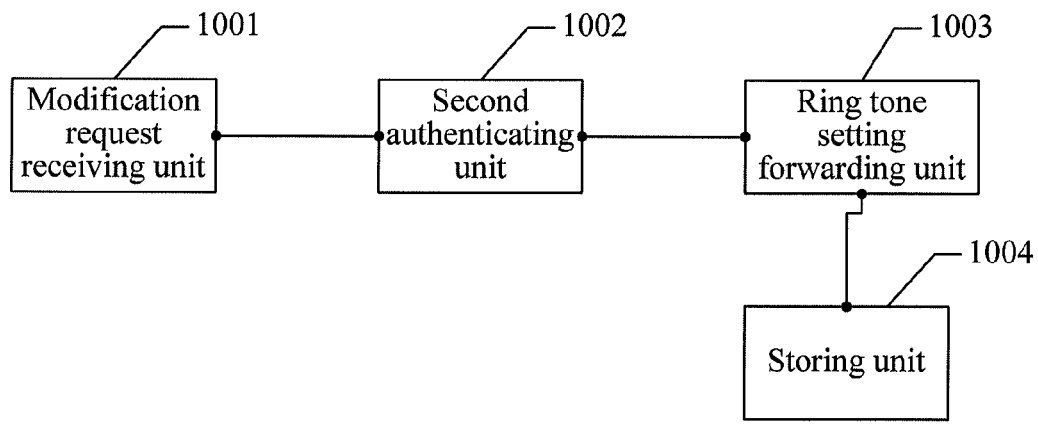
FIG. 10 is schematic diagram of an access server in another embodiment of the present invention.

As shown in FIG. 10, an access server applied in a tone setting modification process in an embodiment of the present invention includes: a modification request receiving unit 1001, a second authenticating unit 1002, a ring tone setting forwarding unit 1003, and a storing unit 1004.

The modification request receiving unit 1001 is configured to receive, through a mobile network, a ring tone setting modifying request sent by a management client.

The second authenticating unit 1002 is configured to authenticate the management client.

The ring tone setting forwarding unit 1003 is configured to: forward the tone setting modification request to the service server when the second authenticating unit 1002 performs the authentication successfully; receive a ring tone setting modifying response fed back by the service server, where the ring tone setting modifying response carries the ring tone setting updated by the service server; and feed back the ring tone setting, which is updated by the service server, to the management client through the mobile network.

It should be noted that the ring tone setting forwarding unit 1003 in this embodiment may not only send the ring tone setting modification request sent by the management client to the service server, but also send the ring tone setting updated by the service server to the management client. In practical applications, the two sending processes may be separately implemented by different modules in the ring tone setting forwarding unit 1003.

The storing unit 1004 is configured to store the ring tone setting updated by the service server.

It should be noted that in this embodiment, the second authenticating unit 1002 not only authenticates the management client, but also authenticates the user and/or user terminal according to the authentication policy of the operators; or authenticates any two of these items: the user, the management client, and the user terminal; or authenticates all the three items. The subsequent operations are performed only after the authentication succeeds.

The technical solutions in the foregoing embodiments have the following benefits:

(1) The management client located in the user terminal sends the ring tone setting processing request to the service server directly through the mobile network after receiving the ring tone setting processing request from the user, with no need to access the website specified by the operators. Therefore, the direct interaction between the management client and the service server can enable the user to more conveniently set the ring tone anytime, without being affected by failure of the website.

(2) Because the management client communicates with the service server directly with no need to access the site, the management client receives no information unrelated to the ring tone setting from the service server, thereby reducing unnecessary network traffic.

(3) The management client interacts with the service server through a mobile network, without creating an Internet connection to the service-specific server. The features of the mobile network ensure that security of the mobile network is higher than that of the Internet. Therefore, the tone setting performed through the mobile network in the embodiment of the present invention effectively improves system security.

(4) The management client sends the tone setting processing request to the service server through HTTP or XCAP, and therefore, the sending process may be based on multiple protocols, the flexibility of the sending process is improved.

(5) When the ring tone setting processing request is sent through XCAP, due to features of the XCAP, data that needs to be transmitted is reduced, and transmission bandwidth is saved.

(6) According to the specific conditions, different functions in the access server may be applied to perform the corresponding processing and authentication, thereby improving flexibility of the authentication process.

(7) Because the access server and/or the service server can authenticate at least one of the following: the user, the user terminal, and the management client, thereby improving flexibility of the authentication process.

Persons skilled in the art should understand that all or part of the steps of the method in the embodiments of the present invention may be implemented by a program instructing relevant hardware. The program may be stored in a computer readable storage medium. When the program runs, the steps of the method in the embodiments of the present invention are performed. The storage medium may be any medium capable of storing program codes, such as ROM, RAM, magnetic disk, or CD-ROM.

The above are described in detail about a service processing method, a communication system, and relevant devices provided in the present invention. Persons skilled in the art can make variations and modifications on the basis of the specific implementations and application scopes according to the ideas of the present invention. Therefore, the contents of the specification shall not be construed as limitations to the present invention.

What is claimed is:

1. A method for managing a ring tone setting of a mobile phone, the ring tone setting being stored at a service server and used to provide customized ring-back tones for callers calling the mobile phone, the method comprising:
   obtaining, by a management client located in the mobile phone, a ring tone setting processing request in response to input from a user of the mobile phone, wherein the ring tone setting processing request carries parameters of the ring tone setting and is used to manage the ring tone setting stored at the service server; and
   sending, by the management client, the ring tone setting processing request to the service server through a mobile network by using Hyper Text Transfer Protocol (HTTP) or XML Configuration Access Protocol (XCAP), without accessing a website, so that the service server is requested to process the ring tone setting according to the ring tone setting processing request;
   wherein the ring tone setting processing request includes any one of the following: a ring tone setting query request, a ring tone setting adding request, a ring tone setting deleting request, and a ring tone setting modifying request;
   wherein the method further comprises: receiving, by an access server, through the mobile network, a ring tone setting query request sent by the management client, and authenticating the management client; if the authentication succeeds, judging whether the ring tone setting of the user corresponding to the management client is stored locally; if the ring tone setting is stored locally, returning the locally stored ring tone setting to the management client through the mobile network; if the ring tone setting is not stored locally, obtaining the user's ring tone setting from the service server, and feeding back the ring tone setting obtained from the service server to the management client through the mobile network.

2. The method according to claim 1, wherein: after the management client sends the ring tone setting processing request to the service server through the mobile network, the method further comprises:
   processing, by the service server, the corresponding ring tone setting according to the ring tone setting processing request; and
   feeding back, by the service server, a ring tone setting processing response to the management client through the mobile network, wherein the ring tone setting processing response carries a processing result.

3. The method according to claim 2, wherein: when the management client sends the ring tone setting processing request to the service server through the mobile network by using XCAP, the method further comprises:
   managing, by the service server, a ring tone setting by using eXtensible Markup Language (XML) files.

4. The method according to claim 1, wherein:
   the ring tone setting processing request is generated according to a ring tone setting operation request input by the user and carries a user identifier of the user who sends the ring tone setting operation request.

5. The method according to claim 4, wherein the ring tone setting processing request further carries at least one of the following parameters:
   query type, setting type, ring tone setting identifier, setting parameter, modification parameter, identifier of a ring tone setting to be deleted, and parameter to be deleted.

6. The method according to claim 5, wherein the setting parameter, the modification parameter, or the parameter to be deleted comprises at least one of the following parameters:
   time setting parameter, status setting parameter, ring tone identifier, and number parameter.

7. The method according to claim 2, wherein: before the service server processes the corresponding ring tone setting according to the ring tone setting processing request, the method comprises:
   authenticating, by the service server, at least one of the following: the user, the mobile phone, the management client; and, if the authentication succeeds, triggering the service server to process a corresponding ring tone setting according to the ring tone setting processing request.

8. A communication system, comprising:
   a mobile phone having a management client located therein; and
   a service server storing a ring tone setting of the mobile phone used to provide customized ring-back tones to callers calling the mobile phone, the management client of the mobile phone being configured to obtain a ring tone setting processing request in response to input of a user of the mobile phone, and send the ring tone setting processing request to the service server through a mobile network by using Hyper Text Transfer Protocol (HTTP) or XML Configuration Access Protocol (XCAP), without accessing a website, wherein the ring tone setting processing request carries parameters of the ring tone setting and is used to manage the ring tone setting stored at the service server; and the service server being configured to receive, through the mobile network, the ring tone setting processing request sent by the management client, and process the ring tone setting of the mobile phone according to the ring tone setting processing request;

wherein the communication system further comprising:

an access server, configured to receive, through the mobile network, a ring tone setting query request sent by the management client, and authenticate the management client; if the authentication succeeds, judge whether the ring tone setting of the user corresponding to the management client is stored locally; if the ring tone setting is stored locally, return the locally stored ring tone setting to the management client through the mobile network; if the ring tone setting is not stored locally, obtain the user's ring tone setting from the service server, and feedback the ring tone setting obtained from the service server to the management client through the mobile network.

9. The communication system according to claim 8, wherein:

the service server is further configured to feed back a ring tone setting processing response to the management client; and the management client is further configured to receive the ring tone setting processing response fed back by the service server.

10. The communication system according to claim 8, wherein the access server is further configured to receive, through the mobile network, a ring tone setting modifying request sent by the management client, and authenticate the management client; if the authentication succeeds, forward the ring tone setting modification request to the service server, and receive a ring tone setting modifying response fed back by the service server, wherein the ring tone setting modifying response carries the ring tone setting updated by the service server; store a ring tone setting updated by the service server, and feedback the updated ring tone setting to the management client through the mobile network.

* * * * *